Feb. 23, 1960 B. J. NORRIS 2,926,309
SCREEN GRID AMPLIFIER
Filed Oct. 4, 1955
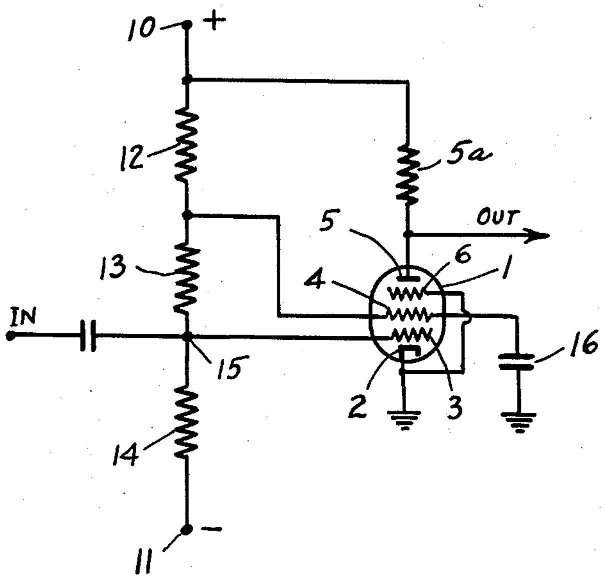
INVENTOR.
BEVITT J. NORRIS.
BY
Lockwood, Galt, Woodard & Smith,
ATTORNEYS.

United States Patent Office 2,926,309

Patented Feb. 23, 1960

2,926,309

SCREEN GRID AMPLIFIER

Bevitt J. Norris, Fort Wayne, Ind., assignor to International Telephone and Telegraph Corporation Application October 4, 1955, Serial No. 538,453

2 Claims. (Cl. 330—111)

This invention relates to alternating current amplifiers and is particularly directed to amplifiers of the tetrode or pentode types.

It is customary to build in stability in an alternating current amplifier by connecting a resistance in the cathode circuit so that undesired changes in space current will be followed by changes in cathode potential with respect to the reference ground or control grid to overcome or neutralize the cause of such changes. It is necessary to bypass such a cathode resistor by a relatively large and expensive condenser, the size of the condenser being sufficient to offer low impedance to the lowest frequencies to be amplified by the tube.

The object of this invention is to construct an improved alternating current amplifier in which the cathode resistor and its large bypass condenser is eliminated without sacrificing stability in the amplifier.

The above-mentioned and other features and objects of this invention and the manner of attaining them will become more apparent and the invention itself will be best understood by reference to the following description of an embodiment of the invention taken in conjunction with the accompanying drawing wherein the single figure is a wiring diagram of said one embodiment.

The amplifier tube 1 has a cathode 2, a control grid 3, a screen grid 4, and an anode 5. This invention contemplates such a screen grid tube with or without the suppressor grid 6 which, if included, is usually connected directly to the cathode. The usual impedance 5*a* is connected in circuit with anode 5.

The power supply for tube 1 (not shown) has terminals 10 and 11, respectively, at high (anode) potentials above and below the reference ground potential. Between terminals 10 and 11 is connected a voltage divider comprising resistances 12, 13 and 14. The ohmic values of the voltage divider resistances are so adjusted that the point 15 of the voltage divider is at or slightly below said reference ground potential by an amount corresponding to the desired grid-cathode bias of the amplifier. Hence, the control grid 3 can be connected to point 15. Next, the screen grid is tapped to the voltage divider between resistances 12 and 13, which is above the control grid connection, so that there is the desired screen grid to cathode potential. The galvanic connection between the electrodes through the voltage divider thus provides a feed-back between the screen grid and the control grid. This feedback is degenerative so that any variation in screen grid voltage caused, for example, by changes in the quiescent space current, will be fed back to the control grid in the proper phase to oppose this change in quiescent current. The screen grid is decoupled for signal frequencies by the by-pass condenser 16 directly to ground. Condenser 16 may be relatively small, compared to the usual cathode by-pass condenser in such an amplifier, inasmuch as the screen current is small compared to the anode-cathode current and only signal frequencies are to be removed from the screen. The usual large cathode by-pass condenser is thus eliminated.

It has been found, in operation, that the heater voltage of a commercial pentode could be reduced to .667 of normal or rated heater voltage without disturbing the gain stability of the pentode. This is to be compared with the usual amplifier having a cathode resistor where .84 of normal heater voltage is the minimum that can be tolerated for gain stability using the same said commercial pentode. Loss of tube stability caused by ageing of the tube is likewise effectively reduced by the circuit of this invention.

The particular value of resistances 12, 13 and 14 will, of course, depend upon the particular amplifier tube used and upon the control grid bias and the relative screen grid and anode potentials desired.

While I have described above the principles of my invention in connection with specific apparatus, it is to be clearly understood that this description is made only by way of example and not as a limitation to the scope of my invention.

What is claimed is:

1. In combination in an alternating current amplifier, a tube with a cathode, a control grid, a screen grid, and an anode; a high voltage anode power supply with positive and negative terminals, a voltage divider across said source, a fixed reference ground, the terminals of the power supply being respectively positive and negative with respect to said ground so that a first point on said voltage divider intermediate the ends thereof is relatively near said ground potential, said cathode being directly connected to ground, said control grid being directly connected to said first point on the voltage divider, said anode being connected to said positive terminal by a load impedance, said screen grid being directly connected to another point on said voltage divider intermediate said positive terminal and said first point, a signal input terminal connected to said first point on said voltage divider, and a signal output terminal connected to said anode.

2. The combination defined in claim 1 further comprising a condenser connected between said screen grid and said reference ground.

References Cited in the file of this patent

UNITED STATES PATENTS

| | | |
|---|---|---|
| 2,102,779 | Beers | Dec. 21, 1937 |
| 2,122,850 | Thompson | July 5, 1938 |
| 2,123,241 | Harley | July 12, 1938 |
| 2,138,891 | Soller | Dec. 6, 1938 |
| 2,243,442 | Schade | May 27, 1941 |
| 2,412,485 | Whiteley | Dec. 10, 1946 |
| 2,536,830 | Ziffer | Jan. 2, 1951 |